United States Patent [19]

Galvin et al.

[11] Patent Number: 5,768,511

[45] Date of Patent: Jun. 16, 1998

[54] METHOD AND SYSTEM FOR MANAGING OBJECTS IN NETWORKED COMPUTER SYSTEM WITH ACTION PERFORMED IN THE SERVER AND OBJECT UPDATED IN THE CLIENT

[75] Inventors: Michael Jeffrey Galvin; Zhiqiang Liu; Mary-Kathryn McLemore Nix, all of Altanta; Vijay Vasandani, Roswell, all of Ga.

[73] Assignee: International Business Machines Corporation, Armonk, N.Y.

[21] Appl. No.: 531,157

[22] Filed: Sep. 18, 1995

[51] Int. Cl.$^6$ ..................................................... G06F 15/16
[52] U.S. Cl. ........................ 395/200.33; 395/200.47; 707/10
[58] Field of Search ................................. 395/680, 683, 395/684, 200.09, 200.05, 200.03, 615, 614, 610, 200.33, 200.32, 200.31, 200.47, 200.48, 200.49; 707/10

[56] References Cited

U.S. PATENT DOCUMENTS

| | | | |
|---|---|---|---|
| 5,129,083 | 7/1992 | Cutler et al. | 395/600 |
| 5,133,075 | 7/1992 | Risch | 395/800 |
| 5,220,516 | 6/1993 | Dodson et al. | 395/200.47 |
| 5,440,744 | 8/1995 | Jacobson et al. | 395/650 |
| 5,493,728 | 2/1996 | Solton et al. | 395/250 |
| 5,511,196 | 4/1996 | Shackelford et al. | 395/600 |
| 5,511,208 | 4/1996 | Boyles | 395/200.53 |
| 5,546,580 | 8/1996 | Seliger et al. | 395/600 |
| 5,581,757 | 12/1996 | Maxey | 395/200.72 |
| 5,606,493 | 2/1997 | Duscher et al. | 395/200.32 |

OTHER PUBLICATIONS

Biliris et al. "Transactions in the Client-Server EOS Object Store", DATA Engineering, 1995 11th Intl. Conf., 1995.

Huang, Sumin "Developing Distributed Applications by Semantics-Based Automatic Replication", Asia-Pacific Software Engineering, 1st Conf., 1994.

Primary Examiner—Dinh C. Dung
Attorney, Agent, or Firm—Kenneth A. Seaman; Calfee, Halter & Griswold

[57] ABSTRACT

The present invention provides a method and system for managing objects in a networked computer system. The networked computer system includes a client and a server. Data is persistently stored in the server in the form of an object. Each object includes attributes and methods and is accessible to a plurality of clients. An object is instantiated and materialized in a client when the client accesses the object. When a client desires to take an action in connection with an object, the server sends an updated object to the client. After receiving the updated object from the server, the client determines whether an existing object has been previously received from the server and stored in the client. If an existing object has not been previously received from the server and stored in the client, the client stores a pointer to the updated object in the client. In either case, the client then merges the existing object and the updated object and notifies windows in the client of changes to the existing object. Thus, the method and system of the present invention enable objects to be efficiently stored and maintained in the client.

25 Claims, 8 Drawing Sheets

METHOD AND SYSTEM FOR MANAGING OBJECTS IN NETWORKED COMPUTER SYSTEM WITH ACTION PERFORMED IN THE SERVER AND OBJECT UPDATED IN THE CLIENT

FIELD OF THE INVENTION

The present invention relates generally to networked computer systems and, more particularly, to a method and system for managing objects in networked computer systems.

BACKGROUND OF THE INVENTION

Networked computer systems enable users to shares resources, such as data. When users have the ability to share data, problems arise in connection with the management of the data. One problem involves how the computer system should handle attempts by multiple users to change the contents of the data if multiple users have access to the data.

A simple solution to this problem is to not allow multiple users to concurrently access data. In this case, multiple users may read or view the data, but only one user may actually access the data and change its contents. While this solution is simple to implement, it also defeats one of the primary purposes of a networked computer system, that is, to allow multiple users to access data.

Another solution to this problem is to allow multiple users to concurrently access data, but to only allow one user to change the contents of the data. If data has been accessed by more than one user, when the first user attempts to save his changes to the contents of the data, the changes will be saved. However, when any of the other users attempts to save their changes to the data, their changes will not be saved. This condition is generally known as optimistic locking because each of the users after the first user is prevented from saving his changes (or is locked out). In addition to not being able to save their changes, these other users will not be aware that someone else has changed the contents of the data until they attempt to save their changes. At that time, these users will have to abandon their changes and retrieve the updated contents of the data.

While this second solution is more desirable than the first solution because it allows multiple users to access data, it also has its drawbacks because it does not allow users to be kept aware of the changes that have been made to the contents of the data by other users. Therefore, a need exists for a networked computer system that allows multiple users to concurrently access data while maintaining the integrity of the contents of the data and keeping users aware of the updated contents of the data.

Another problem that arises in connection with the management of data in a networked computer system involves how the computer system should store the data if multiple users can manipulate the data. A common solution to this problem is to provide each user with a separate copy of the entire data. However, this solution does not efficiently utilize the computer system's resources. Perhaps a given user is only manipulating a small portion of the data. In that case, it would be desirable to provide the user with something less than the entire data. Therefore, a need also exists for a networked computer system that efficiently provides users with the data that they need.

SUMMARY OF THE INVENTION

The present invention provides a method and system for managing objects in a networked computer system. The networked computer system includes a client and a server. Data is persistently stored in the server in the form of an object. Each object includes attributes and methods and is accessible to a plurality of clients. An object is instantiated and materialized in a client when the client accesses the object. When a client desires to take an action in connection with an object, the server sends an updated object to the client.

After receiving the updated object from the server, the client determines whether an existing object has been previously received from the server and stored in the client. If an existing object has not been previously received from the server and stored in the client, the client stores a pointer to the updated object in the client. In either case, the client then merges the existing object and the updated object and notifies windows in the client of changes to the existing object. Thus, the method and system of the present invention enable objects to be efficiently stored and maintained in the client.

DETAILED DESCRIPTION OF THE PREFERRED EMBODIMENT

Figure 1:
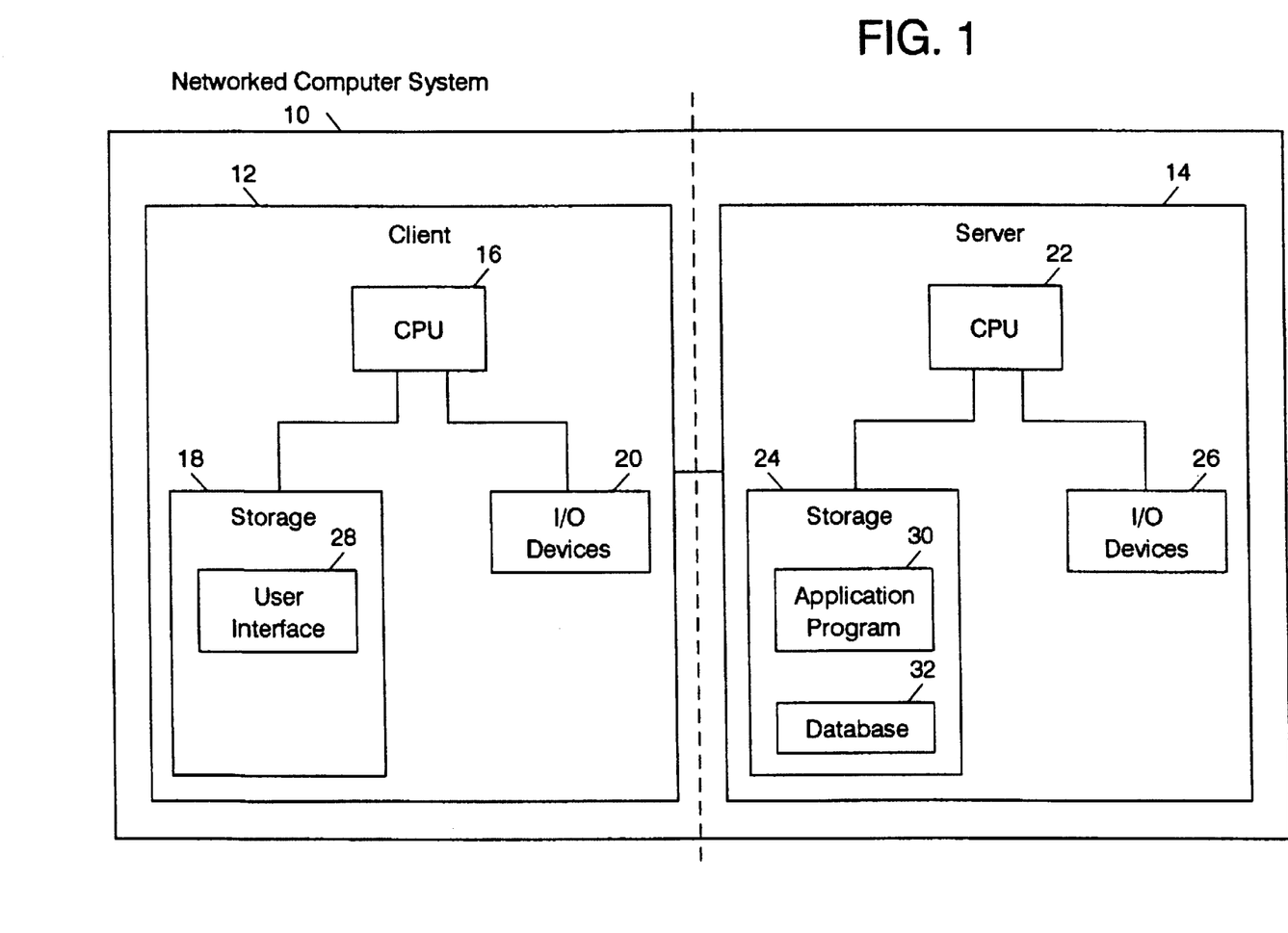
FIG. 1 is a block diagram illustrating a client-server architecture in a networked computer system in which the preferred embodiment of the present invention operates.

The preferred embodiment of the present invention provides a method and system for managing objects in networked computer systems. A networked computer system 10 in which the preferred embodiment of the present invention operates is illustrated in FIG. 1. The networked computer system 10 includes a client 12 and a server 14. The client 12 includes a central processing unit ("CPU") 16, storage 18, and input/output ("I/O") devices 20. Typical I/O devices include a video display, a keyboard, and a mouse (not separately shown). Similarly, the server 14 includes a CPU 22, storage 24, and I/O devices 26. A user interface 28 and a data/communication layer 30 are stored in the client storage 18 for execution by the client CPU 16, and a communication layer 32, an application program 34, and a database 36 are stored in the server storage 24 for execution by the server CPU 22.

For the sake of simplicity, the networked computer system 10 of the present invention has been illustrated with a single client and a single server. However, one of ordinary skill in the art will appreciate that the networked computer system 10 could include any number of clients and servers (and typically, would include a multiple number of clients and a multiple number of servers). Each additional client and server would include components similar to those described above for the client 12 and the server 14.

Figure 2:
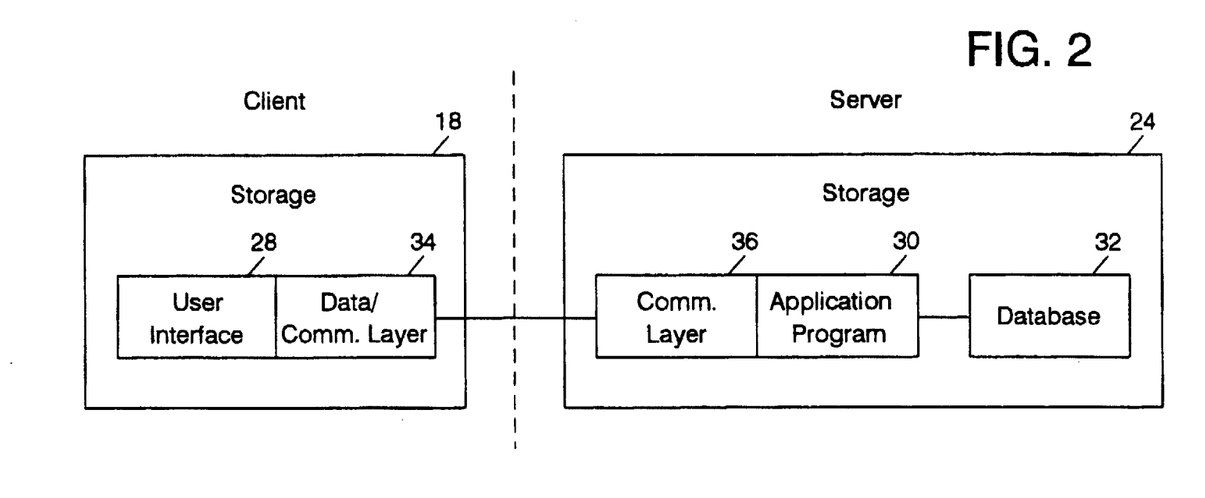
FIG. 2 is a block diagram illustrating the logical relationship between components stored in the client and the server of FIG. 1.

The logical relationship between the user interface 28 and the data/communication layer 30 stored in the client storage 18 and the communication layer 32, the application program 34, and the database 36 stored in the server storage 24 is illustrated in FIG. 2. As stated above, the application program 34 executes on the server CPU 22. During execution, the application program 34 communicates with the user interface 28 to obtain information from a user (through the user interface) and to transmit results to the user (through the user interface). Similarly, during execution, the application program 34 communicates with the database 36 to obtain data from the database and to update data in the database.

As shown in FIG. 2, the client 12 includes a data/communication layer 30 and the server 14 includes a communication layer 32. The client data/communication layer 30 and the server communication layer 32 enable the user interface 28 and the application program 34 to more efficiently manage data in the networked computer system 10. In particular, the layers 30 and 32 enable data that is stored in the database 36 to be retrieved by the application program 34 and efficiently stored and used in the client 12.

Figure 3:
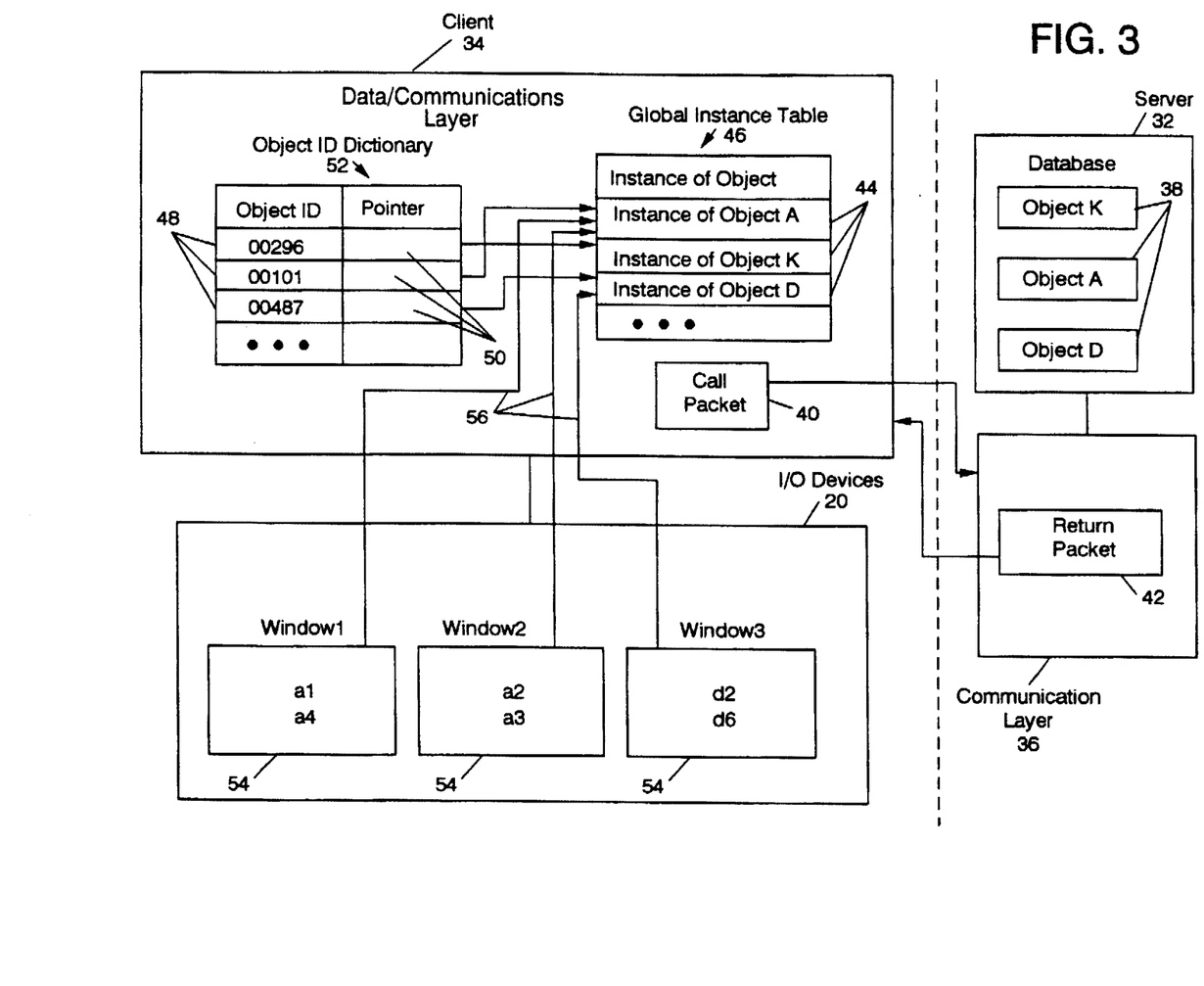
FIG. 3 is a block diagram illustrating the logical relationship between data structures created and stored in the client and the server to accomplish efficient management of data in the networked computer system of FIG. 1.

The data structures created and stored in the client 12 and the server 14 to accomplish the efficient management of the data in the networked computer system 10 are illustrated in FIG. 3. The application program 34 creates and stores data, in the form of objects 38, in the database 36. Objects and object-oriented programming are well-known in the field of computers and computer programming and, thus, will not be described in detail here. A reference that provides a more detailed discussion of objects and object-oriented programming is "Object-Oriented Analysis and Design With Applications" by Grady and Booch (D. Benjamin/Cummins Publishing Company, Inc., 2nd Edition, 1994).

In the preferred embodiment of the present invention, each object 38 includes attributes and methods. The attributes of the object 38 contain the data that defines the structure or characteristics of the object. Exemplary attributes include name and object id (which uniquely identifies each object). The methods of the object 38 define the behavior of the object or the actions that may be taken in connection with the data in the object. Exemplary methods include create a new object, open an existing object, save changes to an existing object, duplicate an object, and delete an object.

When a window or panel 40 in the client 12 desires to use an object 38 that is stored in the database 36, the client data/communication layer 30 creates or opens a version of the object 42 in the client. Because the client 12 typically does not require all of the attributes that are stored in the object 38 in the database 36, the server 14 only transmits, and the client only stores, certain prespecified attributes of the object in the client. The determination of which attributes are to be stored in the client 12 is determined by the client when the version of the object 42 is created or opened.

The object 38 that is stored in the database 36 will sometimes be referred to as a persistent object. All persistent objects 38 are assigned a unique object id 44. The part of the persistent object 38 that is stored in the client 12 will sometimes be referred to as a partial or light-weight object 42. Each partial or light-weight object 42 always includes the object id 44 of the corresponding persistent object 38 in order to identify the persistent object in the database 36 to which the partial object corresponds. By only storing the necessary attributes of the persistent object 38 in the client 12, the system of the present invention more efficiently utilizes both network and memory resources.

Similarly, because the client 12 does not require all of the methods that are associated with the persistent object 38 in the server 14, only certain prespecified methods associated with the object are accessible to the client. The determination of which methods are to be accessible to the client 12 is determined by the server 14. The methods that are accessible to the client 12 are referred to as process methods.

Figure 4:
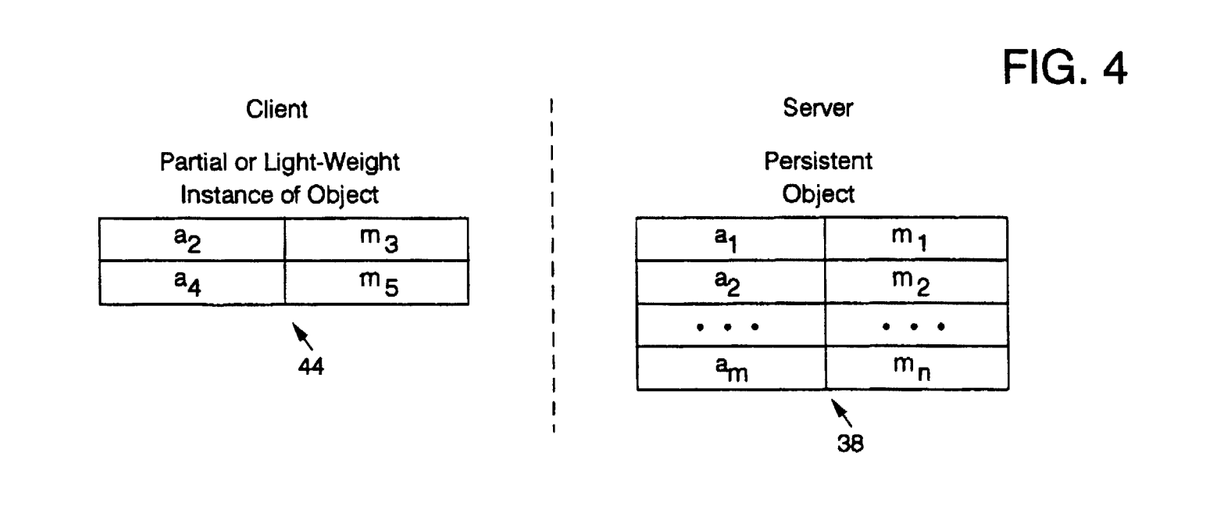
FIG. 4 is a block diagram illustrating the logical structures of a partial or light-weight object and a persistent object stored in the client and the server of FIG. 3.

FIG. 4 shows an exemplary persistent object 38 and an exemplary partial or light-weight object 42. The persistent object 38 in the server 14 includes m attributes ($a_1, a_2, \ldots a_m$) and has associated with it n methods ($m_1, m_2, \ldots m_n$). However, the client 12 only requires attributes $a_2$ and $a_4$. Thus, the partial or light-weight object 42 in the client 12 only includes these attributes (plus the object id attribute). For each attribute stored in the client 12, the partial object 42 includes a clean field and a dirty field. The clean field contains the data that is stored in the attribute in the persistent object 38, and the dirty field contains any changes that have been made to the partial object 42 by a user (through a window 40) in the client 12 but have not been saved to the database 36. With regard to methods of the persistent object 38, the server 14 has determined that only methods $m_3$ and $m_5$ should be accessible to the client 12. Thus the partial object 42 in the client 12 will only be able to access these process methods.

Referring back to FIG. 3, the creation or opening of the version of the object 42 in the client 12 is known as instantiation of the object. Instantiation involves: (1) storing the partial object 42 in a global instance table 46 and (2) storing a reference 48 to the object in the global instance table in an instance list 50 associated with the window 40 that desires to use the object. Each window 40 has an instance list 50 associated with the window. The instance list 50 includes references 48 to each of the partial objects 42 displayed in the window 40. After instantiation, the partial object 42 in the global instance table 46 only includes the structure of the object. Data from the persistent object 38 in the server 14 is not yet available in the partial object 42. In order to fetch data from the persistent object 38 and display the partial object 42 in the window 40, the user must execute a process method. The execution of a process method will be discussed below.

Once the partial object 42 is displayed in the window 40, the user can add data to the object or change data in the object. When one window 40 makes changes to the data in the partial object 42, the changed data is stored in the dirty field of the object and the object is locked from further changes by other windows in the client 12. While the changed data has been stored in the dirty field of the partial object 42, the changed data has not been committed to the database 36 in the server 14.

Moreover, once the partial object 42 is displayed in the window 40, the user can take an action in connection with the object, i.e., execute a process method associated with the object. The user (through a window 40) sends a request to the client data/communication layer 30 to execute a particular process method in connection with a particular partial object 42 referenced in the window's instance list 50. Upon receiving the request from the user, the client data/communication layer 30 creates a method call packet 52 and sends the method call packet to the server communication layer 32. The method call packet 52 generally includes information required to execute the requested process method on the specified object (the method call packet will be described in greater detail below).

The application program 34, based on the information in the method call packet 52, completes the requested process method on the specified object (if possible). The server communication layer 32 then creates a method return packet 54 and sends the method return packet to the client data/communication layer 30. The method return packet 54 generally includes information regarding the completion of the requested process method on the specified object (the method return packet will also be described in greater detail below).

After receiving the method return packet 54 from the server communication layer 32, the client data/communication layer 30 uses the information in the method return packet to update the partial object 42 in the client 12. If data from the persistent object 38 in the server 14 has not been previously received and stored in the client 12, the client data/communication layer 30 stores the object id 44 corresponding to the object together with a pointer 56 to the partial object 42 in the global instance table 46 in an object id dictionary 58. Next, the client data/communication layer 30 merges the existing object 42 in the global instance table 46 and the updated object in the method return packet 54 and notifies windows 40 of the changes to the object 42. The initial storing of data from the persistent object 38 in the database 36 to the partial object 42 in the client 12 is known as materialization of the object.

Figure 5:
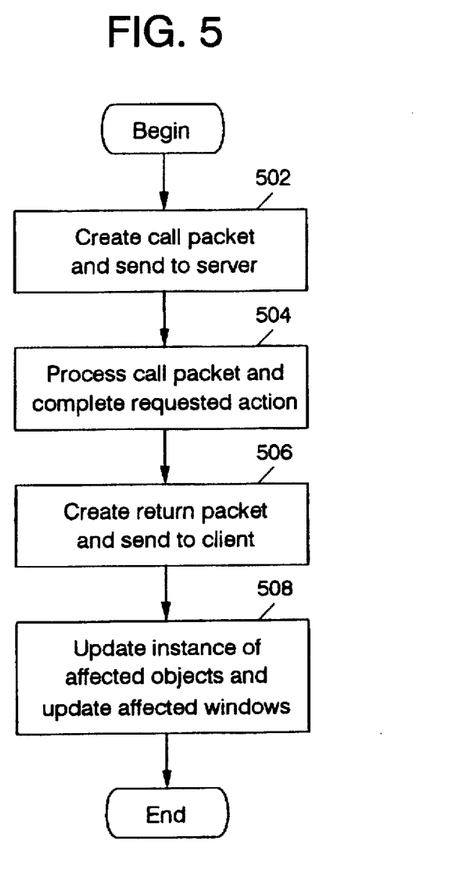
FIG. 5 is a flowchart illustrating the steps performed in executing a process method associated with a partial object in the system of FIG. 3.

The steps performed in executing a process method associated with a partial object 42 in the preferred embodiment of the present invention are illustrated in greater detail in FIG. 5. As stated above, when a user desires to execute a process method associated with a partial object 42, the user (through a window 40) sends a request to the client data/communication layer 30 to execute a particular process method in connection with a particular object referenced in the window's instance list 50 (step 502). Upon receiving the request from the user, the client data/communication layer 30 creates the method call packet 52 and sends the method call packet to the server communication layer 32 (step 504). Typical process methods that may be executed in connection with an object include creating a new object, opening an existing object, saving changes to an existing object, duplicating an object, and deleting an object. While a number of specific process methods that may be executed in connection with an object have been listed for illustration purposes, one of ordinary skill in the art will appreciate that many other process methods can be executed in connection with an object.

Figure 6A:
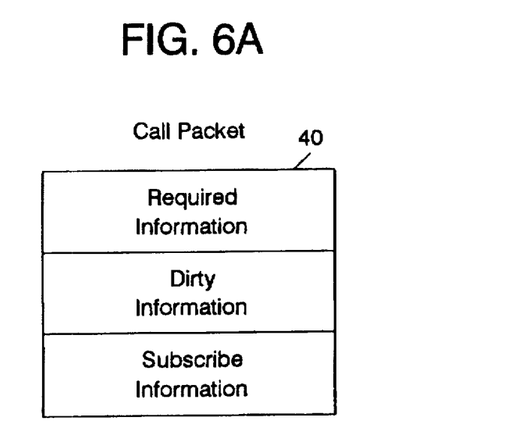
FIG. 6A is a block diagram illustrating the logical structure of a method call packet in the system of FIG. 3.

The logical structure of the method call packet 52 is illustrated in FIG. 6A. The method call packet 52 includes at least three types of information:

(1) required information—this information defines the object(s) and the attributes of the object(s) which must be sent to the server in order to execute the desired process method, this information is dictated by the server;

(2) dirty information—this information defines the object(s) and the attributes of the object(s) that must be sent to the server if they have been changed by the client but not saved to the database, this information is dictated by the server; and (3) subscribe information—this information defines the object(s) and the attributes of the object(s) for which the client would like to receive return values and for which the server has determined the client should receive return values, this information is dictated by both the client and the server.

A client might subscribe to receive a return value for a particular object and attribute of the object because the attribute is displayed to the user in a window 40 or the attribute is required for later processing in the client 12. The client might also subscribe to receive a return value for all attributes of a particular object because the object is currently being used by the client in one or more windows 40 (such as the window requesting execution of the process method or any other window) so that the client can receive any changes made by another user to the persistent object 38 since the partial object 42 was last updated on the client 12.

After receiving the method call packet 52 from the client data/communication layer 30, the server communication layer 32 passes the information in the method call packet to the application program 34. The application program 34 materializes the object on the server 14 (step 506), completes the requested process method on the specified object, if possible (step 508), and de-materializes the object on the server (step 510). The server communication layer 32 then creates the method return packet 54 and sends the method return packet to the client data/communication layer 30 (step 512).

Figure 6B:
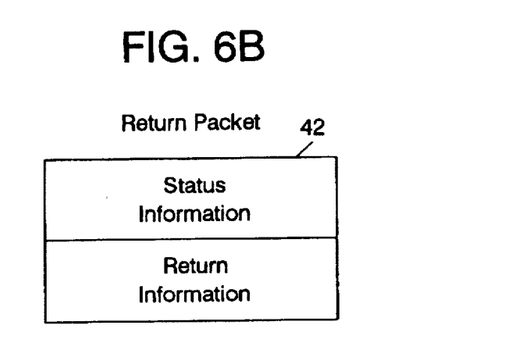
FIG. 6B is a block diagram illustrating the logical structure of a method return packet in the system of FIG. 3.

The logical structure of the method return packet 54 is illustrated in FIG. 6B. The method return packet 54 includes at least two types of information:

(1) status information—this information defines the status of the requested action, e.g., successful, unsuccessful; and (2) return information—this information includes the values of the object(s) and the attributes of the object(s) for which the return values were requested in the subscribe information in the method call packet 52.

After receiving the method return packet 54 from the server communication layer 32, the client data/communication layer 30 uses the information in the method return packet to update the partial object 42 in the client 12 (step 514).

Figure 7:
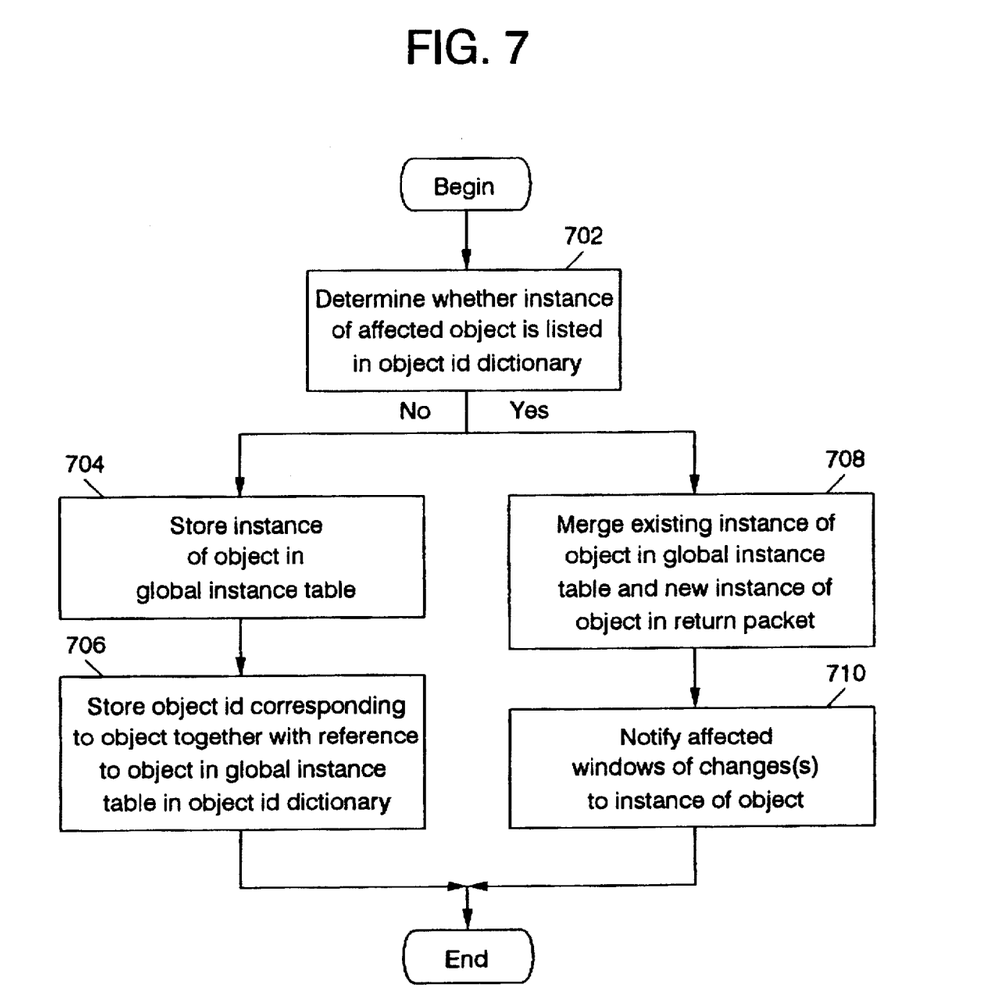
FIG. 7 is a flowchart illustrating the step of FIG. 5 of updating a partial object in the client.

The step of updating the partial object in the client (step 514) is illustrated in greater detail in FIG. 7. Initially, the client data/communication layer determines whether the object is listed in the object id dictionary (step 702). If the object is listed in the object id dictionary, the object has been previously received from the server and stored in the client. If the object is not listed in the object id dictionary, the client data/communication layer stores the object id corresponding to the object together with the pointer to the partial object in the global instance table in the object id dictionary (step 704). In either case, the client data/communication layer then: (1) merges the existing object in the global instance table and the updated object in the method return packet (step 706) and (2) notifies windows of the changes to the object (step 708).

Figure 8:
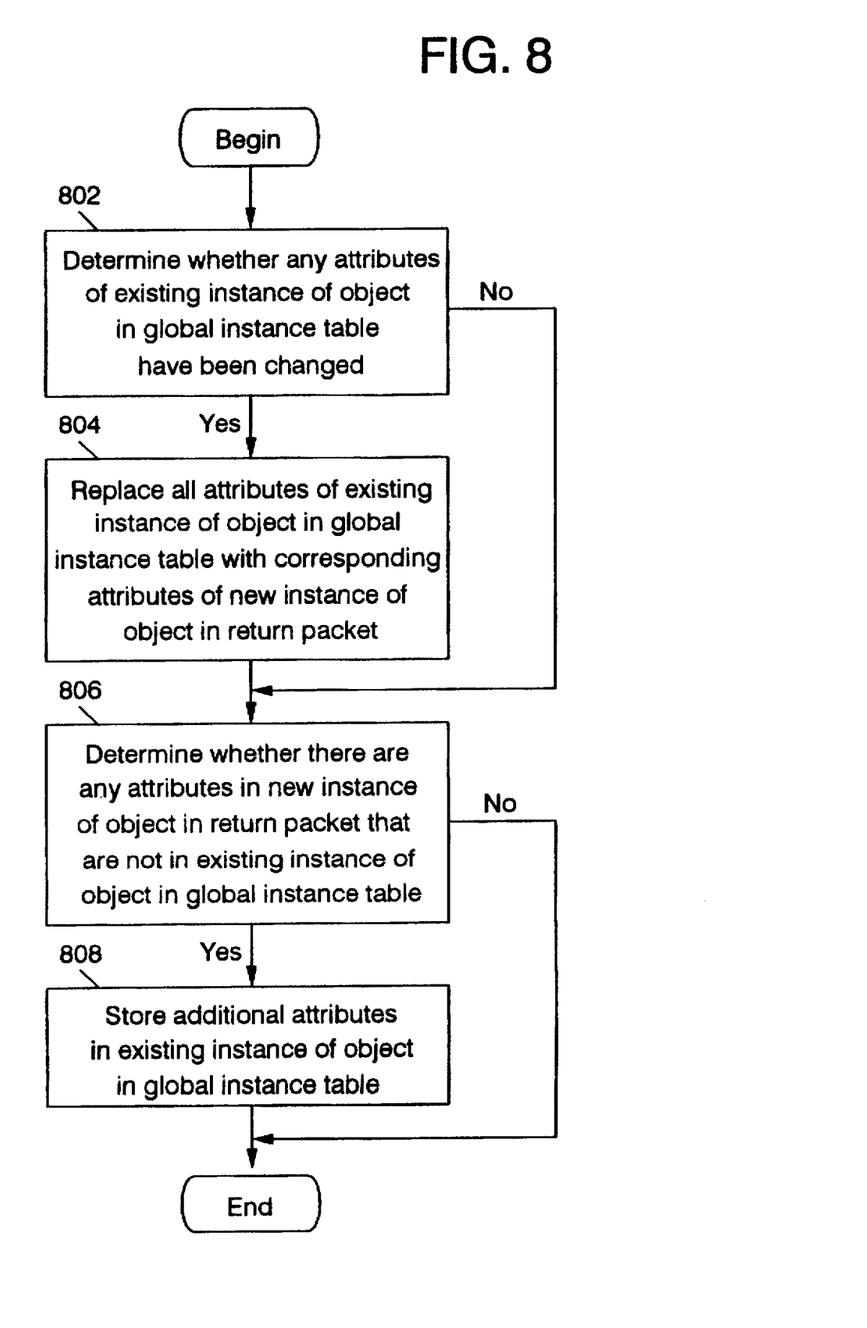
FIG. 8 is a flowchart illustrating the step of FIG. 7 of merging an existing object in a global instance table and an updated object in a method return packet.

The step of merging the existing object in the global instance table and the updated object in the method return packet (step 706) is illustrated in greater detail in FIG. 8. Initially, the client data/communication layer determines whether there is any data in a dirty field in the existing object (step 802) and, if so, whether the window that requested the execution of the process method in connection with the object is the window that changed the data in the dirty field (step 804). If there is data in a dirty field in the existing object and the window that changed the data in the dirty field is not the window that requested the execution of the process method in connection with the object, the client data/ communication layer creates a new object that includes the data in the dirty field and stores this new object in the client data/communication layer (step 806). The reference to the object in the instance list associated with the window that changed the data in the dirty field is then changed to reference the new object in the client data/communication layer (step 808). This condition is known as alienation because the window that has changed the data in the dirty field references an older version of the object than the latest version of the object stored in the global instance table.

Next, the client data/communication layer replaces all of the values of the attributes of the existing object in the global instance table with the corresponding values of the attributes of the updated object in the method return packet (step 810). Further, the client data/communication layer determines whether there are any attributes in the updated object in the method return packet that are not in the existing object in the global instance table (step 812). If there are any additional attributes in the updated object, the client data/ communication layer stores the additional attributes in the existing object in the global instance table (step 814).

Figure 9A:
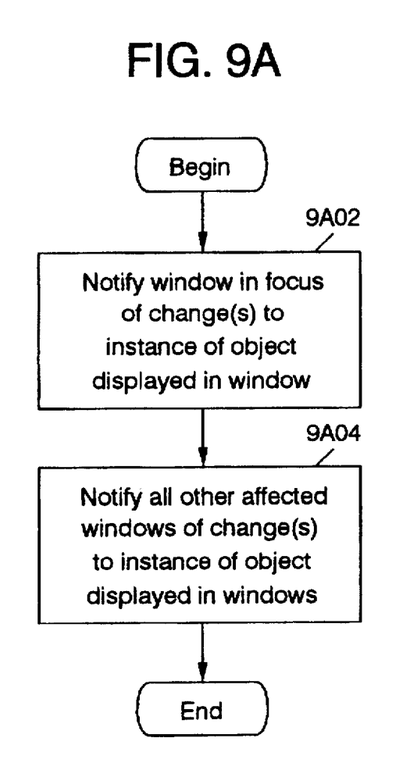
FIGS. 9A, 9B and 10 are a flowchart illustrating the step of FIG. 7 of notifying windows of changes to an object.
Figure 9B:
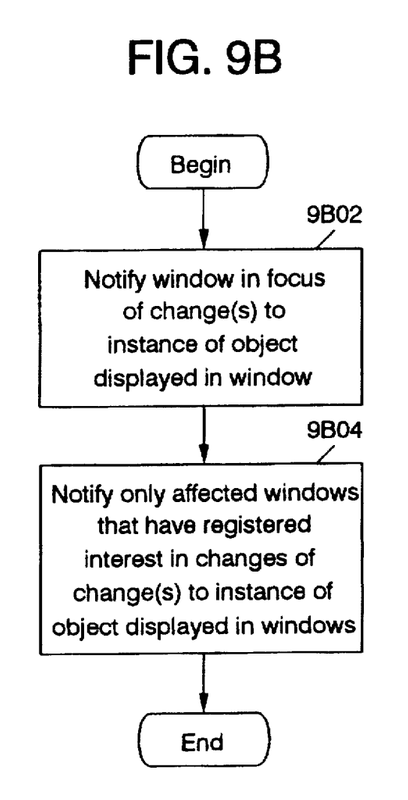
Figure 10:
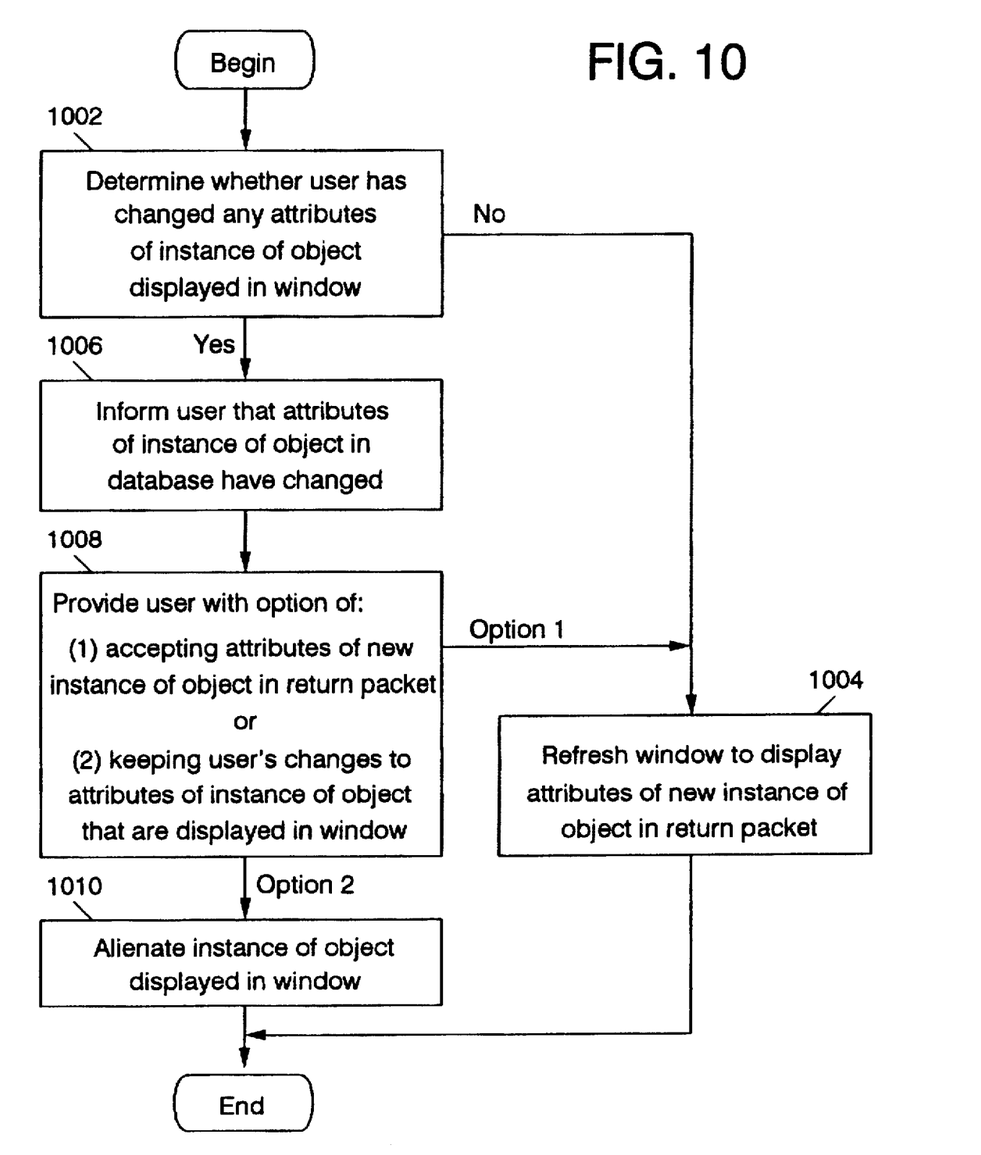

The step of notifying windows of the changes to the object (step 708) is illustrated in greater detail in FIG. 9. The notification involves a local notification and, upon request, a global notification. As shown in FIG. 9, the client data/ communication layer first notifies the window associated with the instance list that was sent to the client data/ communication layer in the request to execute the process method in connection with the object, i.e., the window that requested the execution of the process method in connection with the object (step 902). After notification, this window refreshes itself to display the values of the attributes of the updated object in the method return packet. This is known as local notification. Upon request from the user interface, the client data/communication layer then notifies all other windows associated with an instance list that includes a reference to an object that has been changed since the window was last notified of any changes (step 904). After notification, these windows refresh themselves to display the values of the attributes of the updated object in the method return packet. This is known as global notification.

With regard to a window associated with an instance list that includes a reference to an object that has been alienated, the next time the user attempts to use that window, the user interface informs the user that the attributes of the object in the database have been changed and provides the user with the option of: (1) accepting the attributes of the updated object in the global instance table or (2) keeping the user's changes to the attributes of the object displayed in the window. If the user selects the first option, the window refreshes itself to display the values of the attributes of the updated object in the global instance table and is unalienated. If the user selects the second option, the window remains alienated.

One of ordinary skill in the art will now appreciate that the present invention provides a method and system for managing objects in networked computer systems. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method for managing data in a networked computer system, the computer system including at least one client and at least one server, the data being persistently stored in the server in the form of an object, each object including at least one attribute and at least one method, each attribute having a value, each object being accessible to a plurality of clients, an object being instantiated and materialized in a client when the client takes an action in connection with the object; the method comprising the steps of:

when a window in a client that references an object in the client desires to take an action in connection with the object, sending a request to perform a particular action in connection with the object from the client to the server;

completing the requested action in connection with the object in the server;

after completing the requested action, sending an updated object from the server to the client;

updating the object in the client;

storing an object id together with a pointer to the object in the client in an object id dictionary if the object has not been previously received from the server and stored in the client;

merging an existing object in the client and the updated object from the server and notifying windows in the client of changes to the object in the client, including replacing values of attributes of the existing object with corresponding values of attributes of the updated object;

determining whether there are any attributes in the updated object that are not in the existing object and storing any additional attributes in the existing object;

notifying the window in the client that desired to take the action in connection with the object of changes to the object, and refreshing the window to display the values of the attributes of the updated object.

2. A method for managing data in a networked computer system, the computer system including at least one client and at least one server, the data being persistently stored in the server in the form of an object, each object including at least one attribute and at least one method, each attribute having a value, each object being accessible to a plurality of clients, an object being instantiated and materialized in a client when the client takes an action in connection with the object, the method comprising the steps of:

when a window in a client that references an object in the client desires to take an action in connection with the object, sending a request to perform a particular action in connection with the object from the client to the server;

completing the requested action in connection with the object in the server;

after completing the requested action, sending an updated object from the server to the client;

updating the object in the client.

3. The method of claim 2, wherein the step of updating the object in the client includes the step of:

if the object has not been previously received from the server and stored in the client, storing an object id together with a pointer to the object in the client in an object id dictionary.

4. The method of claim 2, wherein the step of updating the object in the client includes the steps of:

merging the existing object in the client and the updated object from the server; and notifying windows in the client of changes to the object in the client.

5. The method of claim 4, wherein the step of merging the existing object in the client and the updated object from the server includes the step of:

replacing the values of the attributes of the existing object with the corresponding values of the attributes of the updated object.

6. The method of claim 4, wherein the step of merging the existing object in the client and the updated object from the server includes the steps of:

determining whether there are any attributes in the updated object that are not in the existing object; and if there are any additional attributes in the updated object, storing the additional attributes in the existing object.

7. The method of claim 4, wherein the step of notifying windows in the client of changes to the object in the client includes the step of:

notifying the window in the client that desired to take the action in connection with the object of changes to the object.

8. The method of claim 7, further including the step of:

refreshing the window to display the values of the attributes of the updated object.

9. The method of claim 4, wherein the step of notifying windows in the client of changes to the object in the client includes the step of:

notifying all windows in the client that reference the object that changed of changes to the object.

10. The method of claim 9, further including the step of:

refreshing the windows to display the values of the attributes of the updated object.

11. A method for managing data in a networked computer system, the computer system including at least one client and at least one server, the data being persistently stored in the server in the form of an object, each object including at least one attribute and at least one method, each attribute having a value, each object being accessible to a plurality of clients, an object being instantiated and materialized in a client when the client takes an action in connection with the object, the method comprising the steps of:

when a window in a client that references an object in the client desires to take an action in connection with the object, sending a request to perform a particular action in connection with the object from the client to the server;

completing the requested action in connection with the object in the server;

after completing the requested action, sending an updated object from the server to the client;

merging the existing object in the client and the updated object from the server; and notifying windows in the client of changes to the object in the client.

12. The method of claim 11, further comprising the step of:

if the object has not been previously received from the server and stored in the client, storing an object id together with a pointer to the object in the client in an object id dictionary.

13. The method of claim 11, wherein the step of merging the existing object in the client and the updated object from the server includes the step of:

replacing the values of the attributes of the existing object with the corresponding values of the attributes of the updated object.

14. The method of claim 11, wherein the step of merging the existing object in the client and the updated object from the server includes the steps of:

determining whether there are any attributes in the updated object that are not in the existing object; and if there are any additional attributes in the updated object, storing the additional attributes in the existing object.

15. The method of claim 11, wherein the step of notifying windows in the client of changes to the object in the client includes the step of:

notifying the window in the client that desired to take the action in connection with the object of changes to the object.

16. The method of claim 15, further including the step of:

refreshing the window to display the values of the attributes of the updated object.

17. The method of claim 11, wherein the step of notifying windows in the client of changes to the object in the client includes the step of:

notifying all windows in the client that reference the object that changed of changes to the object.

18. The method of claim 17, further including the step of:

refreshing the windows to display the values of the attributes of the updated object.

19. A system for managing data in a networked computer system, the computer system including at least one client and at least one server, the data being persistently stored in the server in the form of an object, each object including at least one attribute and at least on method, each attribute having a value, each object being accessible to a plurality of clients, an object being instantiated or materialized in a client when the client takes an action in connection with the object, the system comprising:

a server having a communication layer and an application program stored in the server, the communication layer receiving a request to perform a particular action in connection with a particular object from a client, the application program completing the requested action in connection with the specified object in the server, and the communication layer sending an updated object to the client; and a client having a data/communication layer stored in the client, the data/communication layer receiving the updated object from the server, merging the existing object in the client and the updated object from the server, and notifying windows in the client of changes to the object in the client, a global instance table stored in the client in which the objects in the client are stored; and an object id dictionary stored in the client in which pointers to the objects in the global instance table are stored.

20. A method for managing data in a networked computer system, the computer system including at least one client and at least one server, the data being stored in the server in the form of a persistent object, each object including at least one attribute and at least one method, each attribute having a value, each object being accessible to a plurality of clients, an object being initiated and materialized in a client when the client takes an action in connection with the object, the method comprising the steps of:

when a window in a client desires to create or open a version of a persistent object in the client, storing a partial object in the client and storing a reference to the partial object in the client in an instance list associated with the window;

wherein the partial object only includes the attributes of the persistent object required by the window, wherein the attributes of the partial object in the client are a subset of the attributes of the persistent object in the server.

21. A computer program product for use in a networked computer system, the computer system including at least one client and at least one server, the data being persistently stored in the server in the form of an object, each object including at least one attribute and at least one method, each attribute having a value, each object being accessible to a plurality of clients, an object being instantiated and materialized in a client when the client takes an action in connection with the object, the computer program product comprising:

a computer usable medium having computer readable program code means embodied in the medium for managing data in a networked computer system, the computer readable program code means including:

computer readable program code means for, when a window in a client that references an object in the client desires to take an action in connection with the object, sending a request to perform a particular action in connection with the object from the client to the server;

computer readable program code means for completing the requested action in connection with the object in the server;

computer readable program code means for, after completing the requested action, sending an updated object from the server to the client;

computer readable program code means for merging the existing object in the client and the updated object from the server; and computer readable program code means for notifying windows in the client of changes to the object in the client.

22. The computer program product of claim 21, wherein the computer readable program code means for merging the existing object in the client and the updated object from the server includes:

computer readable program code means for replacing the values of the attributes of the existing object with the corresponding values of the attributes of the updated object.

23. The computer program product of claim 21, wherein the computer readable program code means for merging the existing object in the client and the updated object from the server includes:

computer readable program code means for determining whether there are any attributes in the updated object that are not in the existing object and, if there are any additional attributes in the updated object, for storing the additional attributes in the existing object.

24. The computer program product of claim 21, wherein the computer readable program code means for notifying windows in the client of changes to the object in the client includes:

computer readable program code means for notifying the window in the client that desired to take the action in connection with the object of changes to the object.

25. The computer program product of claim 21, wherein the computer readable program code means for notifying windows in the client of changes to the object in the client includes:

computer readable program code means for notifying all windows in the client that reference the object that changed of changes to the object.

* * * * *